April 28, 1931.    C. F. ELLISON    1,802,886
HOISTING RIGGING
Filed Jan. 25, 1930    2 Sheets-Sheet 2
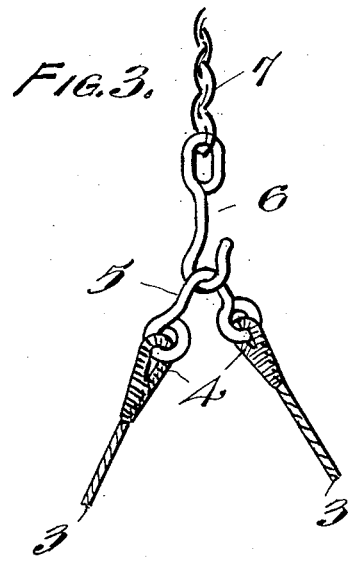
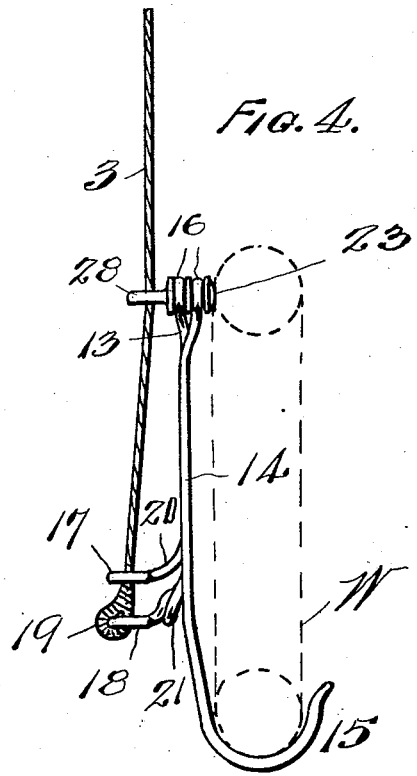
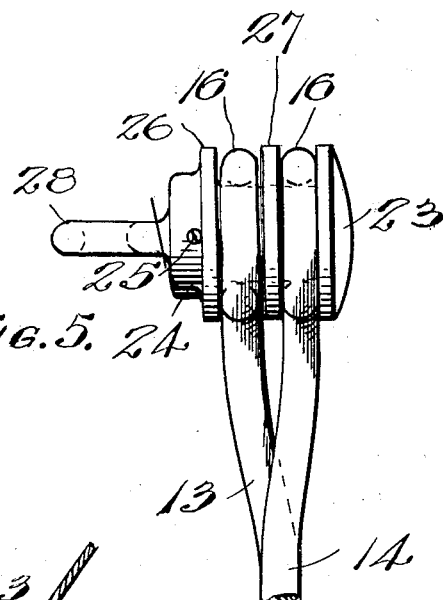
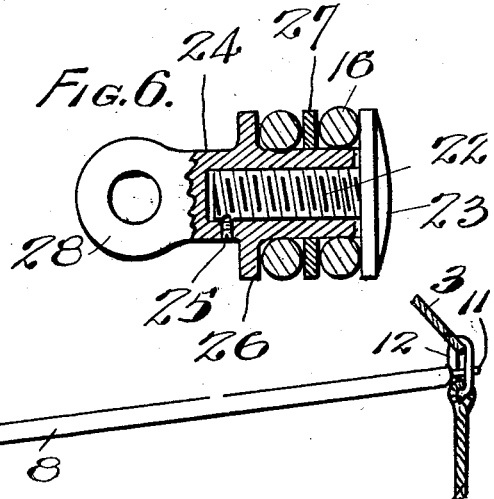
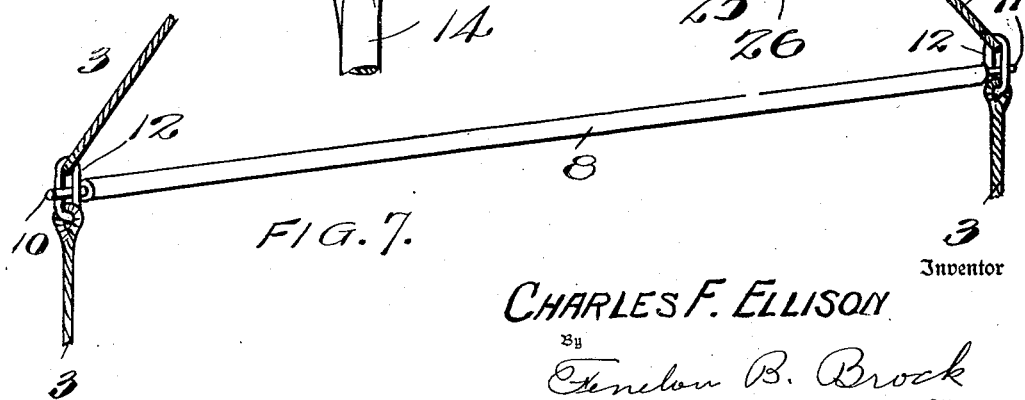
Inventor
CHARLES F. ELLISON
By
Fenelon B. Brock
Attorney Patented Apr. 28, 1931

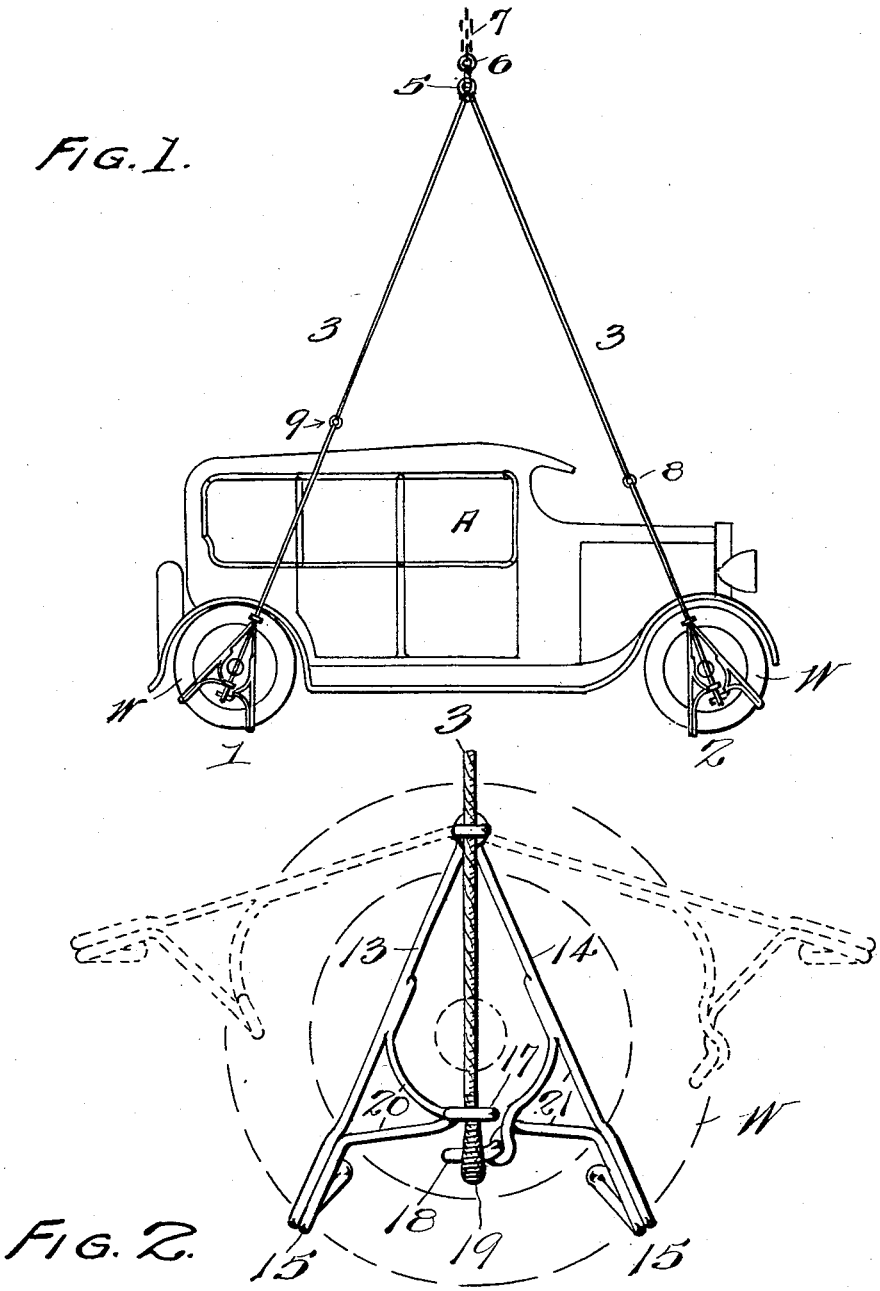

1,802,886

UNITED STATES PATENT OFFICE

CHARLES FLETCHER ELLISON, OF CRISTOBAL, CANAL ZONE

HOISTING RIGGING

Application filed January 25, 1930. Serial No. 423,510.

While the hoisting rigging of my invention may be adapted for various purposes, it is especially designed for use in handling automotive vehicles that are being loaded and unloaded to and from ships, it being understood that the vehicles in transit are fully equipped and in running order, so that their wheels, or the tires of the wheels, may be utilized with the rigging.

In carrying out my invention I utilize a pair of slings, one at each side of the vehicle, (as a passenger car) which slings are suspended from the crane by the fall or hoist line, and each sling includes a set of two pairs of grapple hooks for engagement with the four wheels of the car. The parts of the grapple hooks are so combined and arranged as to insure facility in attaching and detaching the slings to and from the wheels, and means are provided whereby marring of the car is eliminated.

The grapple hooks of a pair and the sling line or lift cable are so combined that when the car is lifted, the weight or load of the car is utilized to securely clamp the jaws of the hooks over the tire of the wheel, and to prevent accidental disengagement of the jaws from the tires. When the sling is released from the weight of the car, the sling lines or lifting cables are loosened, and the hooks may then with facility be disengaged from the wheels.

The hooks are automatically adjustable for engagement with different sizes of wheels and tires, and the slings are readily adjustable for the accommodation of cars having varying wheel bases.

The rigging is made up of a minimum number of parts so that it may be manufactured at comparatively low cost, the parts are simple in construction, and the hooks may be fashioned from stamped sheet metal, wrought or pressed steel bars that are preferably welded, or in other suitable manner.

The invention consists in certain novel combinations and arrangements of parts as will hereinafter be more fully set forth and claimed. In the accompanying drawings I have illustrated one complete example of the physical embodiment of my invention, wherein the parts are combined and arranged according to the best mode I have thus far devised for the practical application of the principles of my invention. It will be understood that various changes and alterations may be made within the scope of my claims without departing from the principles of my invention.

Figure 1 is a view in side elevation showing an automobile suspended in the hoisting rigging of my invention, as for loading or unloading the car.

Figure 2 is an enlarged view showing one of the pair of grapple hooks, closed in full line position and open in dotted lines.

Figure 3 is a detail view showing the connection of the slings with the fall chain or cable of the hoisting apparatus.

Figure 4 is a view as seen from the left in Figure 2, indicating an automobile wheel in dotted lines.

Figure 5 is an enlarged detail view showing the pivots or hinges for the hooks of a pair.

Figure 6 is a detail sectional view of the device of Figure 5.

Figure 7 is an enlarged view, partly broken away for convenience of illustration, of one of a pair of spreaders or sling braces.

In order that the general arrangement and utility of parts may readily be understood I have shown in Figure 1 a typical passenger automobile A having the customary wheels W, the tires of the wheels being utilized in connection with the pairs of grapple hooks of the sling, indicated in Figure 1 as 1 and 2. The lifting cable for each sling may be a single line or two lines 3, 3, having spliced loops 4 that engage the double eyerings 5 to which the fall hook 6 is coupled, and the fall hook is suspended at the end of the fall line or cable 7 of the hoisting apparatus.

One of the slings is used at each side of the car, and for the purpose of spreading or bracing the slings laterally of the car, I use a pair of braces or spreader poles for the pairs of slings by means of which the sling cables are maintained in perpendicular position relative to the sides of the car that is being hoisted or lowered, thus eliminating danger of shifting the load, and preventing the slings from scraping or otherwise marring the car.

Each brace or spreader comprises a pole, as 8 and 9 at the front and rear portions of the car, and the poles are provided with end pins 10 and 11 that pass through links or eye-rings 12 carried in the ropes or cables 3 of the slings. The poles may readily be placed in position with the pins in the eyes, and they may with equal facility be removed, after they have performed their functions.

Each sling has a set of two pairs of grapple hooks, the hooks being indicated as 13 and 14, and each of the hooks has a jaw 15 adapted to fit around the tire of the wheel, the jaws preferably being of a size to accommodate different sizes of tires, and the metal of the jaws also possesses resiliency so that they will cling to or clasp the tire firmly.

Each hook is fashioned with a pivot eye 16 at the end opposite its jaw, and in addition each hook has an eye complementary to an eye on the other hook. Thus the hook 13 has a guiding eye 17 and the hook 14 has an anchoring eye 18, the latter being used as an anchor for the spliced loop 19 at the end of the lifting cables 3, 3, or at the ends of the single lifting cable of a sling, if a single cable is used.

The guide eye 17 and the anchoring eye 18 are inset at adjoining sides of the hooks and offset at the outer sides of the hooks, the eye 17 being fashioned as part of a brace 20 and the eye 18 being fashioned as part of a brace 21. These braces are integral, or welded, rigid, parts of the hooks, and the eyes 17 and 18 are located in position so that they may be pulled or drawn into substantial alinement with a spoke of the wheel when the hooks are closed, as in full lines Figure 2. In the full line position of Figure 2, the jaws 15 of the hooks are also alined with spokes of the wheel, i. e. the jaws fit around the tire on radial lines, and they form substantial supports for the wheel of the car when the latter is suspended from the hoisting apparatus.

The two eyes 16 of the hooks are suspended on a single pivot or hinge that includes a pivot bolt 22 having a head 23, and a threaded thimble 24 is screwed onto the bolt and secured by a set screw or bolt 25 to prevent turning of the thimble on the bolt.

The thimble forms the actual pivotal support for the two eyes 16, and the thimble is fashioned with a flange 26 to retain the outer eye 16 thereon, while a washer 27 may be interposed between the two eyes to reduce friction, and insure ready lubrication of the parts. In this manner a stable and substantial pivot or hinge device is provided to insure an ample bearing for the hooks, reduce friction, and permit adequate lubrication of the parts at the pivot or hinge joint.

The thimble is also fashioned with a guide eye 28 through which the sling cable or lifting cable 3 freely passes, and when the hooks are in holding position, as in Figure 2, the cable 3 is substantially perpendicular to the load (or car) from its lower anchoring eye 18 to the guide eye 12 of the spreader or brace.

The hooks are openable to the dotted line position of Figure 2, in order that they may readily be clasped beneath the wheel tire. After the jaws are properly placed about the wheel-tire, the lifting cables 3, 3, are tightened, bringing the eyes 17 and 18 toward alined position, and the weight or load of the car in the slings pulls on the lift cables, removing all slack, and rendering taut the lift cables as they hold the two eyes 17 and 18 in alinement. The load or car is thus maintained in proper balance and may be lifted or lowered without danger of shifting the load, or of being otherwise displaced.

Having thus fully described my invention, what I claim as new and desire to secure by Letters Patent is:—

1. The combination with a pair of pivoted grapple hooks one of which has an offset, lateral brace and an anchoring eye, of a lifting line attached to the eye, a complementary lateral, offset brace on the other hook, and a guide eye on the latter brace for said line.

2. The combination with a pair of pivoted grapple hooks, one of which has a rigid anchoring means below the pivotal connection of the hooks, of a lifting line attached directly to the anchoring means, and a guide member for the line rigidly mounted on the other hook below the pivotal connection, whereby the hooks are closed when weight is imposed on the line.

3. The combination with a pair of grapple hooks having a single pivot member and a guide-eye rigid with said member, an anchoring eye rigid with one of the hooks, a guide eye rigid with the other hook, and a lift line anchored to the anchoring eye and passing successively through the guide eye on a hook and the guide eye rigid with the pivot member.

CHARLES FLETCHER ELLISON.